United States Patent
Hwang et al.

[11] Patent Number: 6,139,670
[45] Date of Patent: Oct. 31, 2000

[54] METHOD OF MAKING GOLF CLUBS OF THERMOPLASTIC COMPOSITE MATERIAL

[75] Inventors: Jen-Loong Hwang; Wen-Hsiang Chen, both of Hsinchu Hsien; Yio Don Wu, Taipei, all of Taiwan

[73] Assignee: Industrial Technology Research Institute, Taiwan

[21] Appl. No.: 09/172,021

[22] Filed: Oct. 14, 1998

[51] Int. Cl.7 .................................. B31C 1/00; B31C 3/00
[52] U.S. Cl. .......................... 156/173; 156/191; 156/245; 425/393; 473/316; 473/319
[58] Field of Search ..................... 156/173, 175, 156/191, 194, 195, 184, 245, 583.3, 425; 473/316, 318, 319, 320; 425/393

[56] References Cited

U.S. PATENT DOCUMENTS

| | | | |
|---|---|---|---|
| 3,579,400 | 5/1971 | Kanyok et al. | 156/294 |
| 3,656,732 | 4/1972 | St. John | 249/179 |
| 5,456,793 | 10/1995 | Myers | 156/583.1 |
| 5,484,498 | 1/1996 | Hogarth et al. | 156/189 |

*Primary Examiner*—Michael W. Ball
*Assistant Examiner*—Jessica Rossi
*Attorney, Agent, or Firm*—Shaw Pittman; Michael D. Bednarek

[57] ABSTRACT

A method of making golf clubs of thermoplastic composite material is disclosed. The present method is characterized in that the composite material wound around a mandrel is consolidated by using a metal sheet. This method comprises the steps of: (a) providing a tapered mandrel, and wrapping the mandrel with at least a sheet of thermoplastic prepreg to form a laminated outer shell; (b) heating the thermoplastic prepreg to a molten state; (c) enclosing the laminated outer shell with at least a metal sheet, and heating the metal sheet and the laminated outer shell while constricting said metal sheet to thereby consolidate the molten prepreg to form a tubular body; and (d) releasing the metal sheet and withdrawing the mandrel from the tubular body.

17 Claims, 3 Drawing Sheets

METHOD OF MAKING GOLF CLUBS OF THERMOPLASTIC COMPOSITE MATERIAL

BACKGROUND OF THE INVENTION

1. Field of the Invention

The present invention relates in general to the fabrication of golf clubs. More particularly, it relates to a method of making golf clubs of thermoplastic composite material.

2. Description of the Related Arts

Composite golf clubs are conventionally made of thermosetting composite material such as epoxy resin/carbon fiber prepreg. Two major methods are employed for making thermosetting golf clubs, which are: (a) the tape rolling method; and (b) the filament winding method.

The tape rolling method for making a thermosetting golf club will now be described by referring to the flow chart of FIG. 1. Epoxy resin/carbon fiber prepreg 100 is wrapped around a mandrel 102 by assistance of a rolling machine (a1). After the wrapping, the mandrel is further wound with longitudinally and latitudinally oriented polypropylene (OPP) tapes (a2), and then heated to 80–150° C. for about 1–3 hours (a3). While the OPP tapes shrinks during the heating, the wrapping prepreg is compressed and hardened to form a compact tubular body. After releasing the OPP tapes (a4), the tubular body is shaped into an appropriate size (a5), and finally, its outer peripheral surface is polished (a6) and painted (a7) to produce a golf club 104.

As to the filament winding method, referring to FIG. 2, the procedures are largely the same except that the composite materials are wrapped around the mandrel in a different manner. The raw material of carbon fiber 200 is first wetted with liquid epoxy resin 202 (b1), and then the resin-covered fiber is wound around the mandrel in a spiral orientation (b2). Afterwards, the same procedures of the OPP winding, heating, OPP releasing, and so forth (b3–b8), are repeated to complete a golf club product 204.

The thermosetting golf clubs thus produced, however, do not have excellent plasticity and, in view of the fact that the thermosetting materials such as epoxy resin cannot be easily recycled, are potential sources of environment pollution. On the other hand, thermoplastic materials are easy-recycle and have excellent shock-absorbing and elastic features. Therefore, the future trend is to make golf clubs of thermoplastic materials. In recent years, polyphenylene sulfide (PPS) and nylon have been considered the most preferable materials for making thermoplastic golf clubs. There have been numerous attempts to make golf clubs of thermoplastic materials; see for example, U.S. Pat. No. 5,198,058.

Methods for making thermoplastic golf clubs can also be classified into the tape rolling method, and the filament winding method. The processes are basically the same as those for making thermosetting golf clubs, except that heat-resistant shrink tapes are used to replace the OPP tapes because the subsequent heating will take place at a much higher temperature (0–80° C. above the crystalline point or softening point of the thermoplastic material.) The crystalline melting points (Tm) of nylon 6 and PPS are 225° C. and 278° C., respectively, whereas that of OPP is only 160° C. Apparently, OPP tapes cannot be processed at such high temperatures, and a substitute having better heat resistance is thus required for making thermoplastic golf clubs. A silicon rubber tape is satisfactory for this demand when making nylon 6 golf clubs. However, because the silicon rubber tape is bound to decompose at above 290° C., it is not qualified for making PPS golf clubs.

The golf clubs produced by using the silicon rubber tapes as shrink tapes generally have spiral mark defects, and as a result, the golf clubs suffer from insufficient strength and rigidity. Also, the silicon rubber tape is high-cost and is made of thermosetting materials which cannot be easily recycled.

SUMMARY OF THE INVENTION

It is therefore an object of the invention to provide a novel method of making golf clubs of thermoplastic composite material. In this method, the use of shrink tapes is not necessary, thus reducing the manufacturing cost and avoiding the defects produced by the shrink tapes.

It is another object of the invention to provide a method of making thermoplastic golf clubs, by which either nylon 6 or PPS can be used as a material for making thermoplastic golf clubs.

It is still another object of the invention to provide a method of making golf clubs of thermoplastic composite material. The golf clubs produced thereby have excellent shock-absorbing and elastic qualities and can be recycled easily.

To accomplish the above objects, the present method is characterized in that the composite material wound around a mandrel is consolidated by using at least a metal sheet rather than shrink tapes.

The method of the invention can be applied in either the tape rolling method or the filament winding method. In the tape rolling method, the process of the invention includes the steps of: (a) providing a tapered mandrel, and wrapping the mandrel with at least a sheet of thermoplastic prepreg to form a laminated outer shell; (b) heating the thermoplastic prepreg to a molten state; (c) enclosing the laminated outer shell with at least a metal sheet, and heating the metal sheet and the laminated outer shell while constricting said metal sheet to thereby consolidate the molten prepreg to form a tubular body; and (d) releasing the metal sheet and withdrawing the mandrel from the tubular body. Examples of thermoplastic prepreg as used herein include nylon/carbon fiber prepreg, polyphenylene sulfide/carbon fiber prepreg, polyphenylene sulfide/glass fiber prepreg, polyether ether ketone (PEEK)/carbon fiber prepreg, and nylon/glass fiber prepreg.

In the filament winding method, the process of the invention includes the steps of: (a) providing a tapered mandrel, and winding the mandrel with a composite material composed of thermoplastic resins and fibers to form a tubular outer shell; (b) heating the composite material so that the thermoplastic resins thereof enter a molten state; (c) enclosing the tubular outer shell with at least a metal sheet, and heating the metal sheet and the tubular outer shell while constricting said metal sheet to thereby consolidate the composite material to form a tubular body; and (d) releasing the metal sheet, and withdrawing the mandrel from the tubular body. Composite materials of thermoplastic resins and fibers suitable for use herein include: commingle yarns, for example, by BASF Structure Material, Inc.; tow powder, for example, by Custom Composite Material, Inc.; tow flex, for example, tow flex II and G30–500 12 K/N6 ribbon by Custom Composite Material, Inc; and 2–6 mm-wide prepreg sheets, for example, nylon 6/carbon fiber prepreg by Quadrax Advanced Materials System, Inc. In either the tape rolling method or the filament winding method, the step (b) is preferably carried out at 0–80° C. above the crystalline melting point (Tm) or softening point of the thermoplastic material. In step (c), the metal sheet can be constricted by a tensile force produced by a pressure cylinder, wherein the tensile force is preferably within the range of about 1–100 kg/cm². The metal sheet suitable for use in the invention can be made of stainless steel, aluminum, or copper, and preferably has a thickness of about 0.03–0.05 mm.

As already mentioned, the present method uses the metal sheet to consolidate the composite materials, thus obviating the need for using expensive silicon rubber tapes. It is also economically advantageous that the metal sheet can be reused. Furthermore, owing to the refractory feature of the metal sheets, this method can readily be used for making nylon clubs, or even PPS clubs that needs high-temperature processing.

Other objects, features, and advantages of the present invention will become apparent from the following detailed description which makes reference to the accompanying drawings.

DESCRIPTION OF THE PREFERRED EMBODIMENTS

First Embodiment

In this embodiment, a process for making a thermoplastic golf club according to the tape rolling method is illustrated.

Two nylon 6/carbon fiber prepreg sheets are cut so as to have fiber orientations of +45° and −45° with respect to the axis of a mandrel, respectively, and to have a length of 115 cm and an enough width to form three plies around the mandrel. Another prepreg sheet is cut so as to have a fiber orientation of 0° with respect to the axis of the mandrel and to have a length of 115 cm and an enough width to form six plies around the mandrel.

The two prepreg sheets having orientations of +45° and −45° are heated to 280° C. and laminated together. The laminated prepreg is wrapped around a tapered mandrel over a rolling table set at 280° C., and the prepreg sheet having the orientation of 0° is subsequently wrapped thereupon to form a laminated outer shell.

Figure 1:
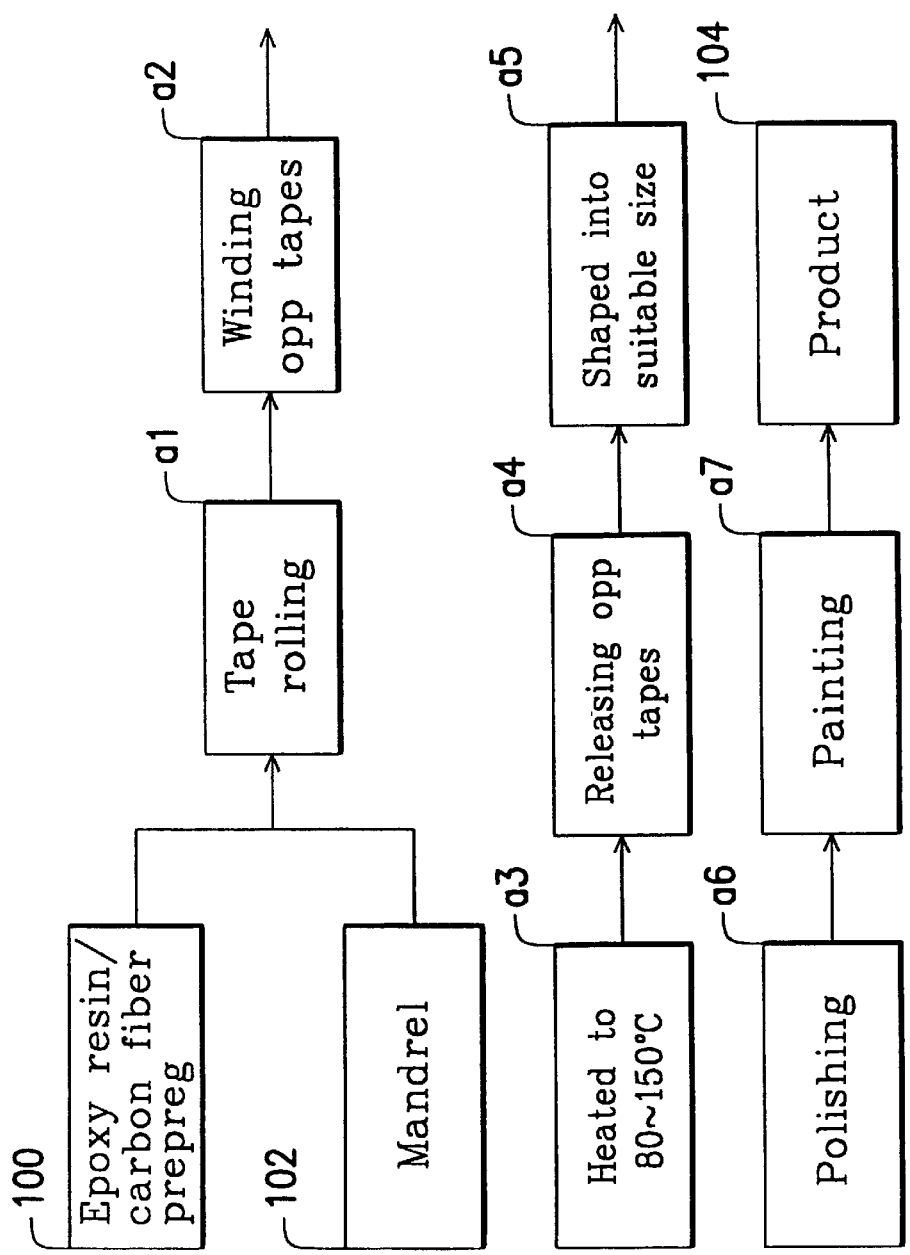
FIG. 1 is a flow chart illustrating the manufacturing process for making thermosetting golf clubs according to the conventional tape rolling method.
Figure 2:
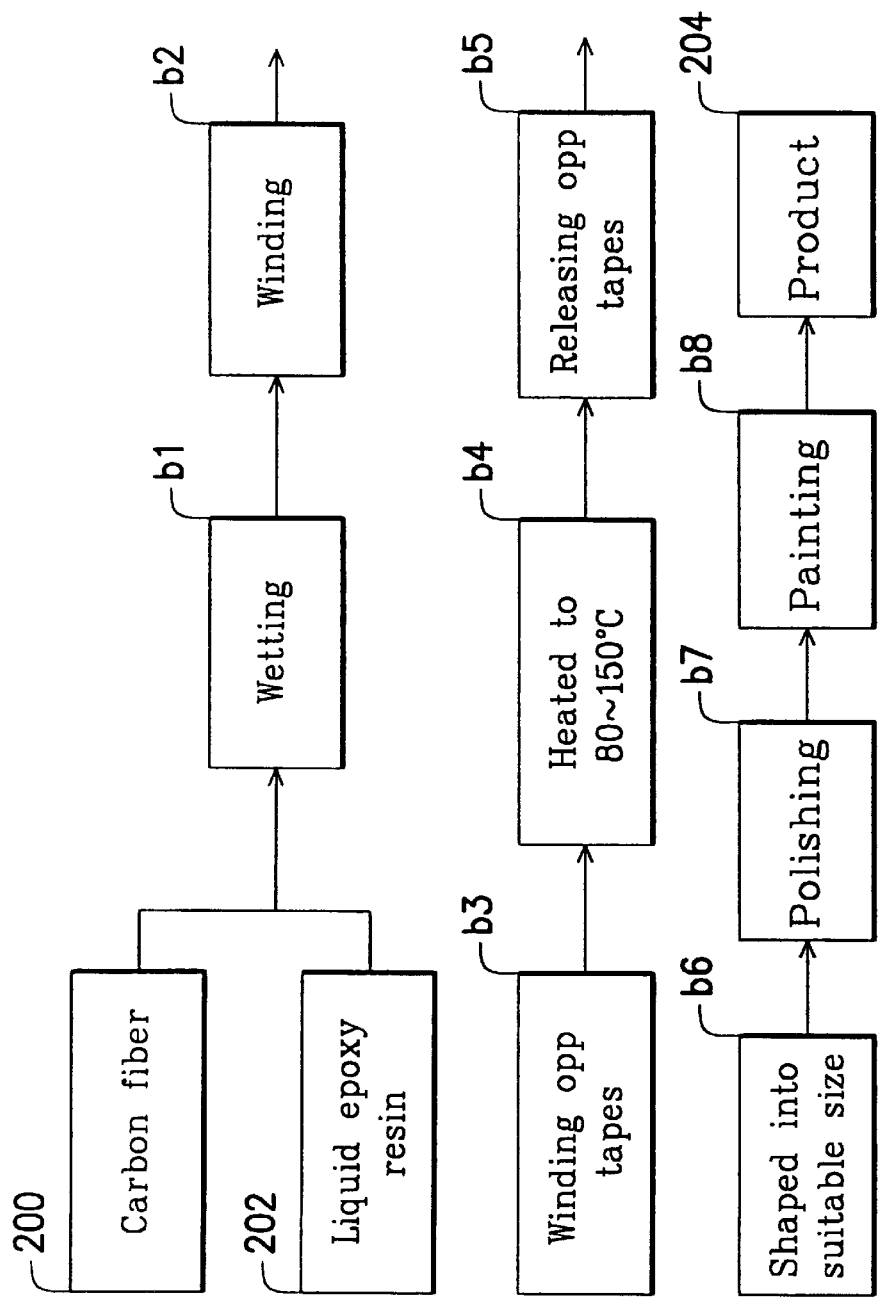
FIG. 2 is a flow chart illustrating the manufacturing process for making thermosetting golf clubs according to the conventional filament winding method.
Figure 3:
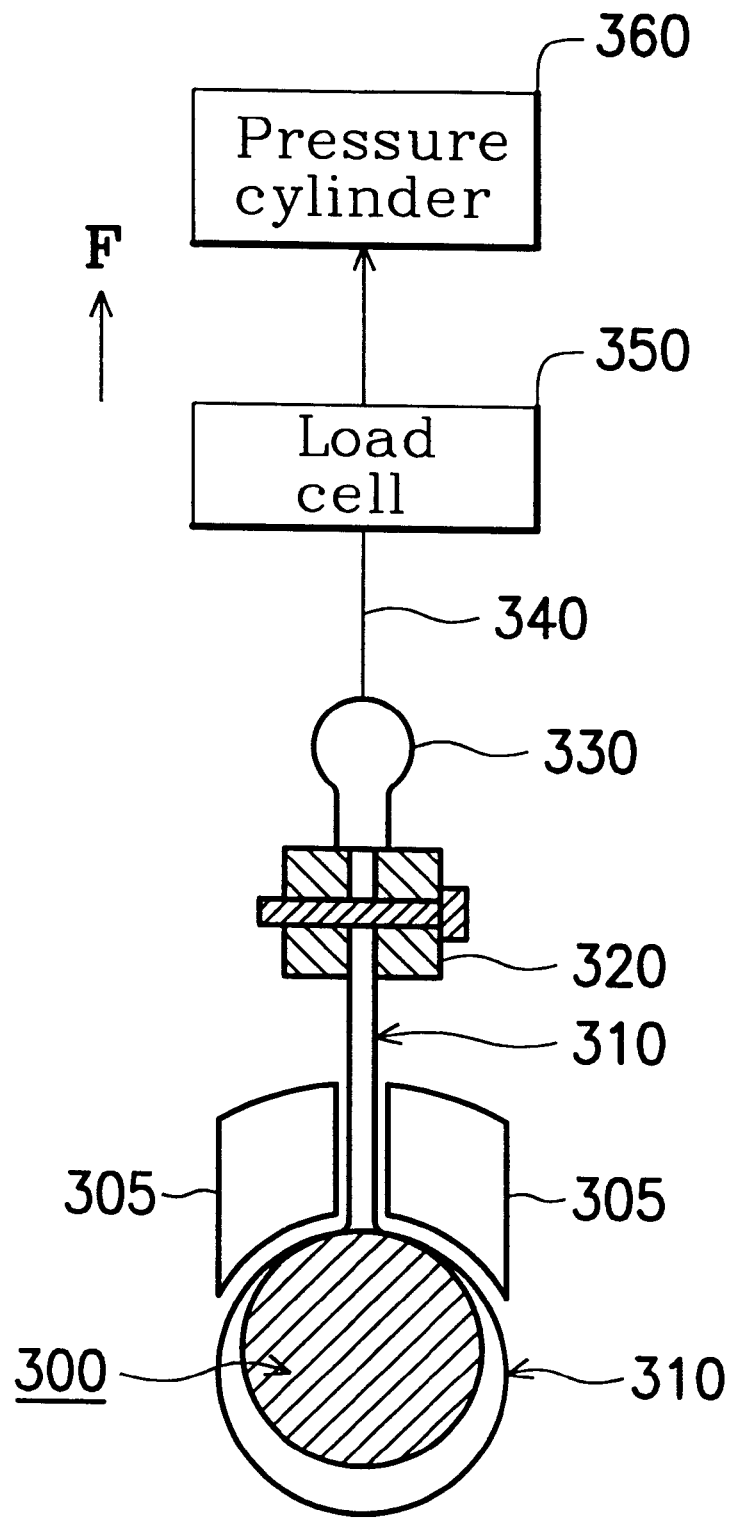
FIG. 3 is a schematic representation of an embodiment of the apparatus used to carry out the invention.

In the next step, the prepreg-wrapped mandrel is affixed to a clamping device as depicted in FIG. 3. As shown in the figure, the outer periphery of prepreg-wrapped mandrel 300 is enclosed with a metal sheet 310 which is clasped by a clamp 320. The clamp 320 is coupled to a pressure cylinder 360 via a steel wire 340 and an iron ring 330 coupled to the clamp. The tensile force exerted from the pressure cylinder can be measured by a load cell 350 set between the cylinder 360 and the iron ring 330. When the clamp 320 is pulled by the pressure cylinder 360, it constricts the metal sheet 310, and at the same time the clamping blocks 305 move towards each other to insure that the entire outer peripheral surface of the tube body can be enclosed and compressed by the metal sheet. This procedure is carried out at a kiln set at 280° C., and the pulling is continued for 30 minutes to complete the consolidation of the composite material.

After cooling, the metal sheet is released, and the mandrel is withdrawn to give a monolithic tubular body. The tubular body is shaped into a suitable size and its outer peripheral surface is polished. Finally, a plating layer is applied on the polished surface to complete a golf club.

Second Embodiment

In this embodiment, a process for making a thermoplastic golf club according to the filament winding method is illustrated. The procedure outlined in the first embodiment is repeated with the exception that the laminated outer shell is prepared by winding commingle yarns of nylon 6/carbon fiber around a mandrel. The tubular body thus formed is subjected to same procedures of shaping, polishing, and plating as set forth in the first embodiment to give a golf club.

While the invention has been particularly shown and described with the reference to the preferred embodiment thereof, it will be understood by those skilled in the art that various changes in form and details may be made without departing from the spirit and scope of the invention.

What is claimed is:

1. A method of making a golf club of thermoplastic composite material, comprising the steps of:
    (a) providing a tapered mandrel, and wrapping said mandrel with at least a sheet of thermoplastic prepreg to form a laminated outer shell;
    (b) heating the thermoplastic prepreg to a molten state;
    (c) enclosing the laminated outer shell with at least a metal sheet with a clamp holding opposed ends of the metal sheet together, and heating the metal sheet and the laminated outer shell while a pressure cylinder pulls on the clamp to constrict the metal sheet thereby applying pressure to consolidate the molten prepreg to form a tubular body; and
    (d) releasing the metal sheet, and withdrawing the mandrel from said tubular body.

2. The method as claimed in claim 1, wherein said thermoplastic prepreg is selected from the group consisting of nylon/carbon fiber prepreg, polyphenylene sulfide/carbon fiber prepreg, polyphenylene sulfide/glass fiber prepreg, polyether ether ketone/carbon fiber prepreg, and nylon/glass fiber prepreg.

3. The method as claimed in claim 1, wherein said thermoplastic prepreg is nylon/carbon fiber prepreg.

4. The method as claimed in claim 1, wherein said metal sheet is made of stainless steel, aluminum, or copper.

5. The method as claimed in claim 4, wherein said metal sheet has a thickness of about 0.03–0.05 mm.

6. The method as claimed in claim 1, wherein in step (a) said prepreg is wrapped around the mandrel with at least two different orientations.

7. The method as claimed in claim 1, wherein in step (b) said prepreg is heated to 0–80° C. above its crystalline melting point (Tm) or softening point.

8. The method as claimed in claim 1, wherein in step (c) said metal sheet is constricted by a tensile force exerted from the pressure cylinder.

9. The method as claimed in claim 8, wherein said tensile force is between about 1–100 kg/cm².

10. A method of making a golf club of thermoplastic composite material, comprising the steps of:
    (a) providing a tapered mandrel, and winding said mandrel with composite material composed of thermoplastic resins and fibers to form a tubular outer shell;
    (b) heating said composite material such that the thermoplastic resins thereof enter a molten state;
    (c) enclosing the tubular outer shell with at least a metal sheet with a clamp holding opposed ends of the metal sheet together, and heating the metal sheet and the tubular outer shell while a pressure cylinder pulls on the clamp to constrict the metal sheet thereby applying pressure to consolidate the composite material to form a tubular body; and (d) releasing the metal sheet, and withdrawing the mandrel from said tubular body.

11. The method as claimed in claim 10, wherein said composite material is selected from the group consisting of commingle yarns, tow powder, tow flex, and 2–6 mm-wide prepreg sheets.

12. The method as claimed in claim 11, wherein said composite material is a commingle yarn composed of nylon 6 and carbon fiber.

13. The method as claimed in claim 10, wherein said metal sheet is made of stainless steel, aluminum, or copper.

14. The method as claimed in claim 13, wherein said metal sheet has a thickness of about 0.03–0.05 mm.

15. The method as claimed in claim 10, wherein in step (b) said composite material is heated to 0–80° C. above the crystalline melting point (Tm) or softening point of the thermoplastic resins thereof.

16. The method as claimed in claim 10, wherein in step (c) said metal sheet is constricted by a tensile force exerted from the pressure cylinder.

17. The method as claimed in claim 16, wherein said tensile force is between about 1–100 kg/cm$^2$.

* * * * *